United States Patent [19]
Maeda

[11] Patent Number: 5,546,111
[45] Date of Patent: Aug. 13, 1996

[54] IMAGE CONTRAST IMPROVEMENT TECHNIQUE FOR OUTPUT SCANNING SYSTEMS

[75] Inventor: Patrick Y. Maeda, Redondo Beach, Calif.

[73] Assignee: Xerox Coporation, Stamford, Conn.

[21] Appl. No.: 161,565

[22] Filed: Dec. 6, 1993

[51] Int. Cl.$^6$ .................................................... H04N 1/21
[52] U.S. Cl. ........................... 347/144; 347/247; 358/298
[58] Field of Search .................................... 347/247, 237, 347/143, 144, 142; 358/296, 298, 300, 302

[56] References Cited

U.S. PATENT DOCUMENTS 5,426,452  6/1995  Davis et al. .............................. 347/247

Primary Examiner—Mark J. Reinhart
Attorney, Agent, or Firm—Fariba Rad

[57] ABSTRACT

A raster output scanning system is disclosed which modifies a train of pixel information used for modulating a light beam to improve the image contrast. In this invention, all the On pixels which have at least one transitional edge will be modified in such a manner that the pulse width of the modified pixels will be shorter than the allocated pulse width for each pixel and the pulse amplitude of the modified pixels will be higher than the amplitude of the unmodified pixels. However, the product of the pulse width and the pulse amplitude of the modified pixels are equal to the product of the pulse width and the pulse amplitude of the unmodified pixels. The modified train of pixel information of this invention creates an exposure profile on the photoreceptor plane with less smearing effect and less variation of the pixel width in accordance with the variation of the xerographic threshold.

5 Claims, 7 Drawing Sheets

IMAGE CONTRAST IMPROVEMENT TECHNIQUE FOR OUTPUT SCANNING SYSTEMS

This application relates to U.S. application Ser. No. 08/161,368, "Image Contrast Improvement Technique for Output Scanning Systems" Attorney Docket No. D/93016Q (Common Assignee) filed concurrently herewith.

This invention relates to image contrast improvement in a raster output scanner and, more particularly, to a raster output scanner which generates a modulated light beam with a shorter pulse width and a higher pulse amplitude to improve the contrast.

Other objects will become apparent from the following description with reference to the drawings wherein.

Figure 1:
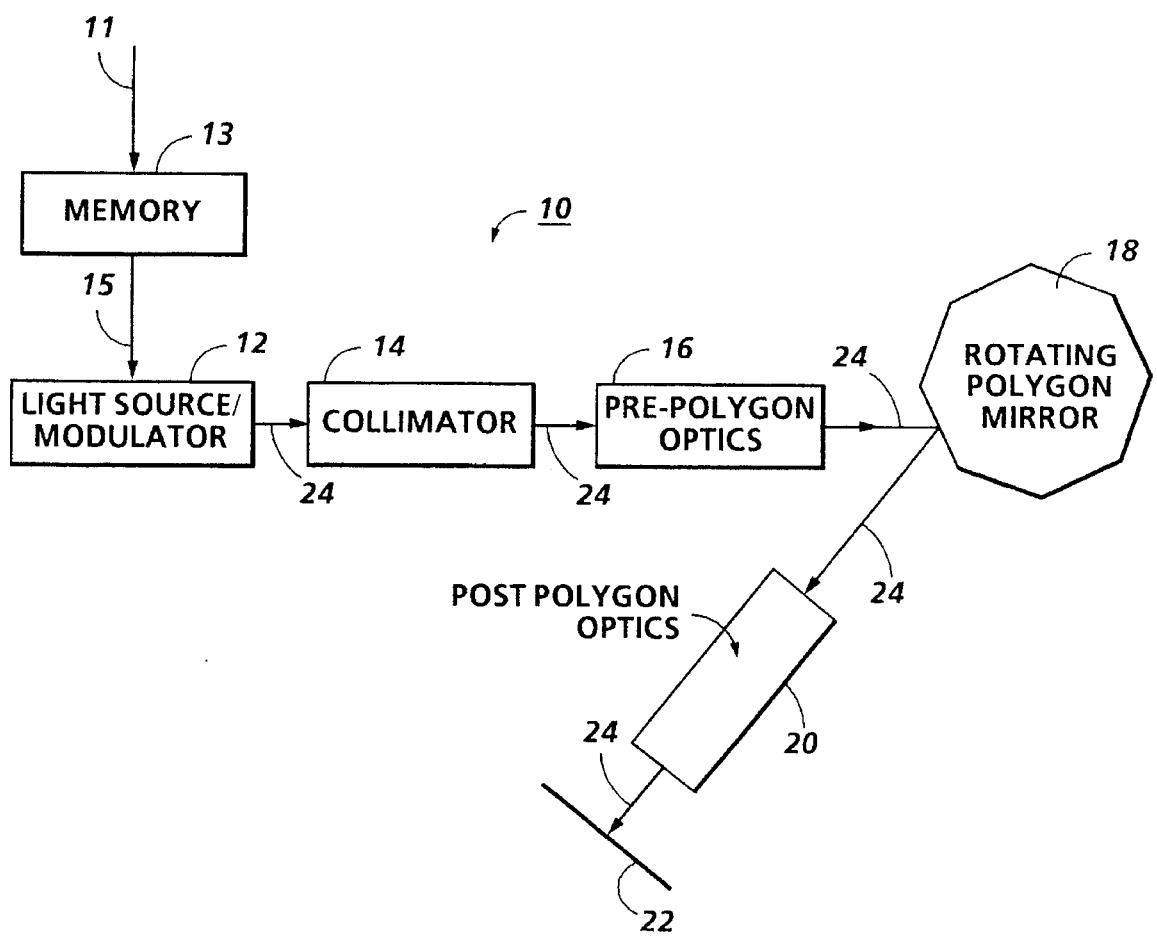
FIG. 1 shows a conventional raster output scanner.

Referring to FIG. 1, there is shown a conventional raster output scanner which utilizes a light source 12, a collimator 14, a pre-polygon optics 16 and a multifaceted rotating polygon mirror 18 as the scanning element, a post polygon optics 20 and a photosensitive medium 22. The light source which can be a laser source, generates a light beam 24 and sends it to the rotating polygon mirror 18 through the collimator 14 and the pre-polygon optics 16.

The rotating polygon mirror 18 reflects the light beam and also causes the reflected light to revolve about an axis near the center of deflection of the rotating polygon and scan a straight line. This reflected light beam can be utilized to scan a document at the input of an imaging system or can be used to impinge upon a photographic film or a photosensitive medium, such as a xerographic drum at the output of the imaging system.

A modulator (not shown) which can be placed at a location prior to the rotating polygon mirror 18 or it can be incorporated within the design of a laser diode, modulates the light beam by turning the light beam On and Off according to a train of pixel information. For example, in FIG. 1, the modulator is incorporated within the design of the light source 12. A train of pixel information 11 is a stream of image data in a binary format which is stored in a memory. The pixel information of one scan line 15 is serially sent from the memory 13 to the modulator 12. The modulated beam transfers the pixel information onto the photosensitive medium (photoreceptor). When the light beam is On, it deposits energy onto the photoreceptor plane.

Figure 2:
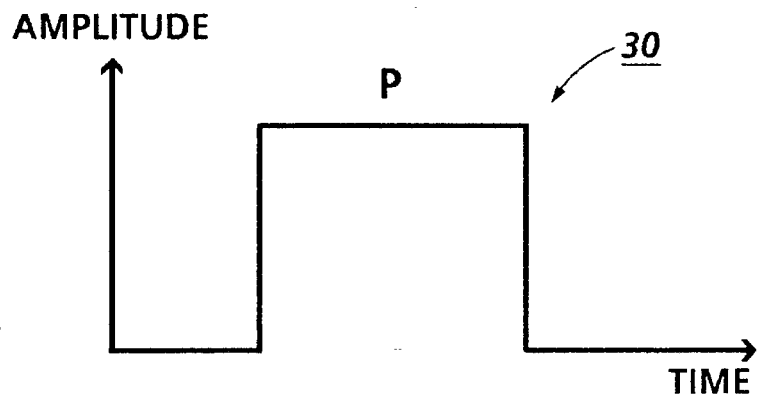
FIG. 2 shows a pulse representing an On pixel of a conventional train of pixel information.
Figure 3:
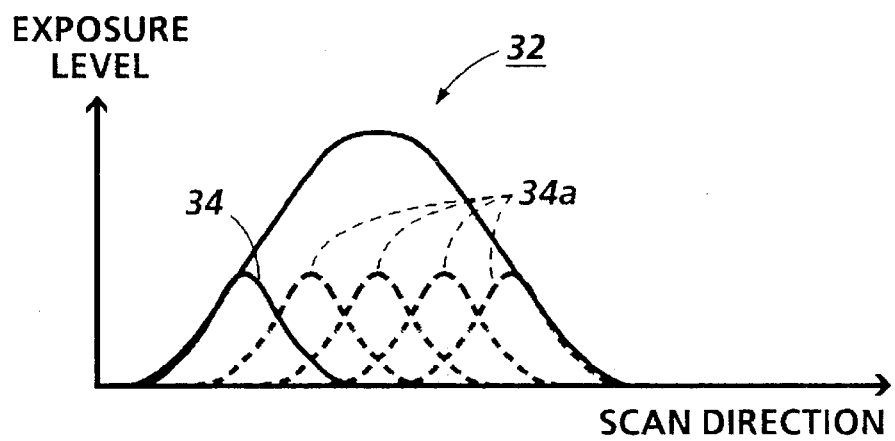
FIG. 3 shows an exposure profile on a photoreceptor being generated by the pulse shown in FIG. 2.

Referring to FIG. 2, there is shown a pulse 30 representing an On pixel of a conventional train of pixel information and referring to FIG. 3, there is shown an exposure profile 32 on a photoreceptor being generated through the pulse shown in FIG. 2. In FIG. 2, the horizontal axis represents time and the vertical axis represents amplitude. In FIG. 3, the horizontal axis represents scan direction and the vertical axis represents exposure level.

When a light beam scans the photoreceptor, it has a Gaussian distribution 34. However, as the light beam moves along its path, it deposits energy onto the photoreceptor. In FIG. 3, the movement of light beam with the Gaussian distribution 34 is shown by discrete movement 34a (shown with dashed lines). However, it should be noted that the movement is a continuous movement and therefore the deposited energy on the photoreceptor is a continuous energy. The deposited energy by each Gaussian distribution has the same profile as the Gaussian distribution which deposited that energy. Therefore, Gaussian distributions 34 and 34a can be considered as the deposited energy on the photoreceptor.

The exposure on the photoreceptor is the sum of the energies deposited on the photoreceptor. Therefore, adding all the energy distributions on the photoreceptor provides the exposure profile on the photoreceptor. For example, for pixel P shown in FIG. 2, the sum of the energy distributions 34 and 34a provides the exposure profile 32.

Figure 4:
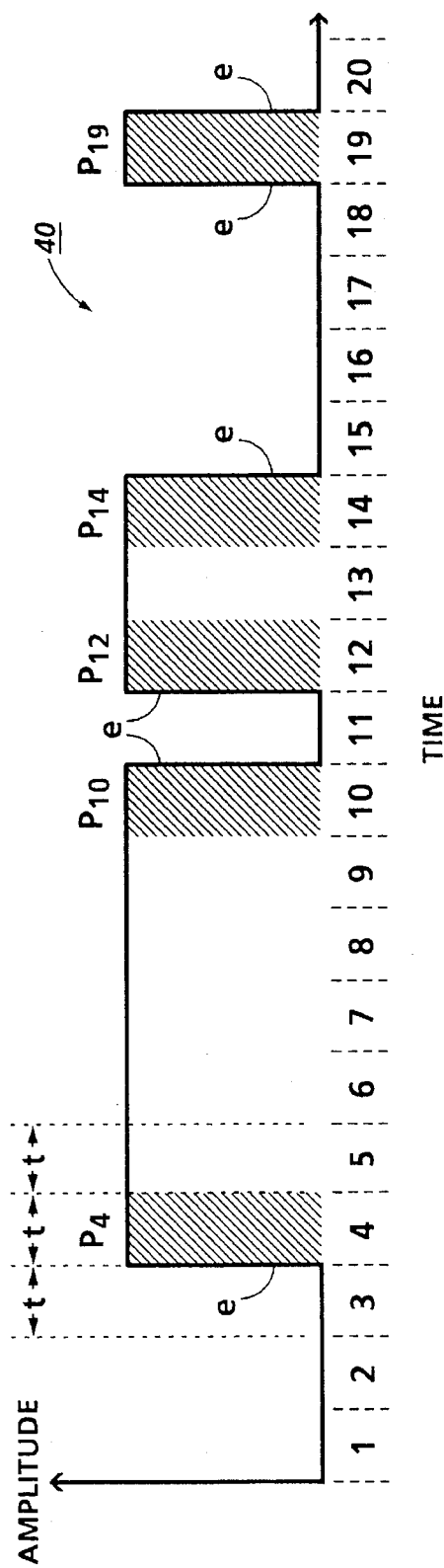
FIG. 4 shows an example of an arbitrary train of conventional pixel information.
Figure 5:
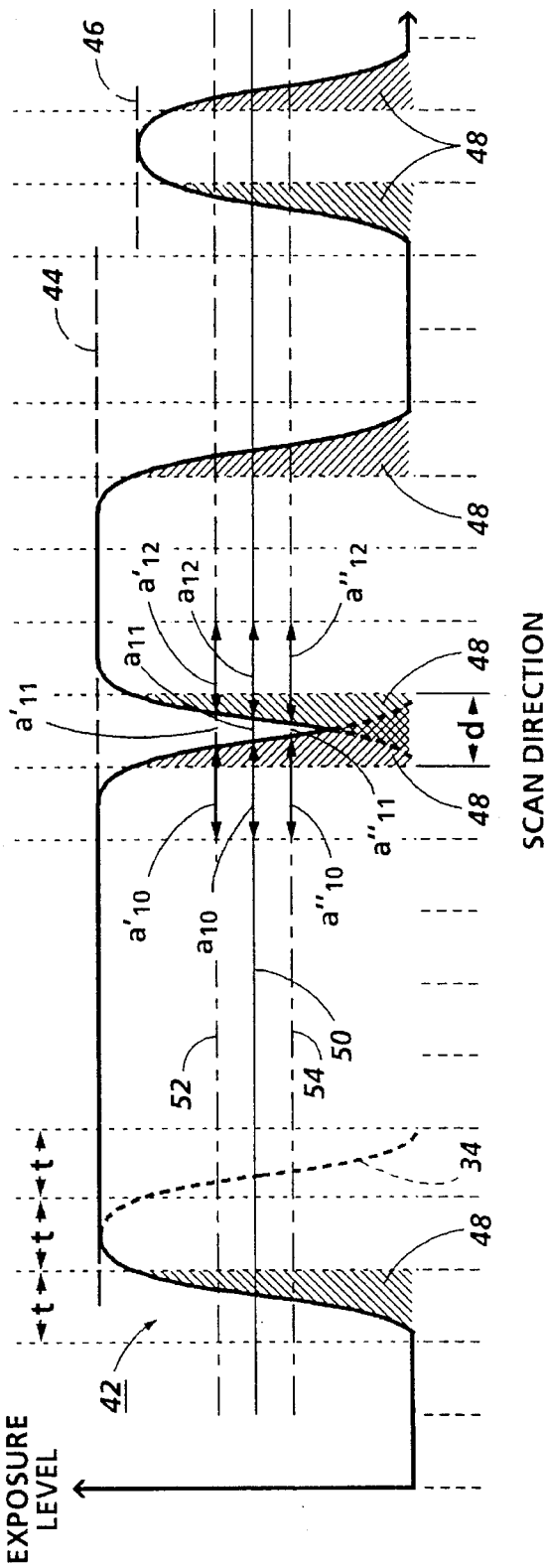
FIG. 5 shows an exposure profile corresponding to the pixel information of FIG. 4.

Referring to FIG. 4 there is shown an example of an arbitrary train of pixel information 40 and referring to FIG. 5 there is shown an example of an exposure profile 42 on a photoreceptor plane corresponding to the pixel information 40 of FIG. 4. In FIG. 4, the horizontal axis represents time and the vertical axis represents amplitude. In FIG. 5, the horizontal axis represents scan direction and the vertical axis represents exposure level. When a light beam scans a line on the photoreceptor, it deposits energy onto the photoreceptor plane. The deposited energy on the photoreceptor plane creates an exposure profile such as the exposure profile 42 of FIG. 5.

Referring to both FIGS. 4 and 5, during the time that there are consecutive On pixels such as P4, P5, P6, P7, P8, P9 and P10 or P12, P13 and P14, since the light beam stays On for a longer time, the exposure level on the photoreceptor reaches a maximum level 44. However, during a single pixel such as P19, since the light beam is On for a shorter time the exposure level on the photoreceptor plane reaches a level 46 which is lower than the maximum level 44.

Since pixel P4 is On, the light beam modulated by this pixel will be turned On to scan the photoreceptor during the allocated time t. The time allocated to each pixel is a fixed time t which hereinafter will be called "pixel time" (the time in which the light beam is On for one pixel or the time in which the light beam is turned On to the time the light beam is turned Off for one pixel). Therefore, the light beam scans the photoreceptor for pixel P4 within a pixel time t and continues scanning the photoreceptor for pixels P5, P6, P7, P8, P9 and P10 and it turns Off at the end of Pixel P10 since the following pixel P11 is an Off pixel.

Pixel P11 is an Off pixel which is located between two On pixels P10 and P12. As it can be observed, the exposure distributions from the two On pixels P10 and P12 overlap onto the allocated space d of pixel P11. Hereinafter, the overlap of the exposure distribution of an On pixel onto an Off pixel will be called "smearing". Therefore, the photoreceptor which should not receive any exposure within space d is exposed by the shaded areas 48. Since all the pixels have equal allocated space, smearing causes the allocated space for the Off pixel to be reduced. Therefore, if the xerographic threshold is selected to be at level 50, then the Off pixel P11 will have a width equal to all which is much smaller than the allocated space d for pixel P11.

Also, since the slope of a conventional exposure distribution is not steep enough, when the xerographic threshold varies, the exposure width changes. For example, if the exposure level is selected to be at level 50, the widths of pixels P10, P11 and P12 will be $a_{10}$, $a_{11}$ and $a_{12}$ respectively. However, if the xerographic threshold changes to 52 or 54 the widths of pixels P10, P11 and P12 will change to $a_{10}'$, $a_{11}'$ and $a_{12}'$ or to $a_{10}''$, $a_{11}''$ and $a_{12}''$ respectively. As it can be observed, if the xerographic threshold increases to level 52, the widths of the pixels P10 and P12 decrease to widths $a_{10}'$ and $a_{12}'$ the width of the pixel P11 increases to width $a_{11}'$ and if the xerographic threshold decreases to level 54, the widths of the pixels P10 and P12 increase to widths $a_{10}''$ and $a_{12}''$ and the width of the pixel P11 increases to width $a_{11}''$. The change of the pixel width happens on all the pixels which have a transitional edge e. A transitional edge is an edge between an On pixel and an Off pixel or visa versa. When there is a transitional edge the variation of the xerographic threshold causes the pixel width to change for both the On pixel and the Off pixel which have a transitional edge in common.

One approach to solve the above problems is to narrow the width of the light beam. As the width of the light beam is made smaller, the Gaussian distribution of the light beam becomes narrower which fits into the allocated space d and as a result the tail of the Gaussian distribution will spread into the adjacent pixel for a lesser amount. However, there are limitations in reducing the width of the light beam. In a polygon scanner, the polygon size is inversely proportional to the width of the light beam at the image plane and for high resolution ($\geq 600$ spot per inch) and mid-to-high speed printing ($\geq 40$ prints per minute) the size can be cost and performance prohibitive.

Figure 6:
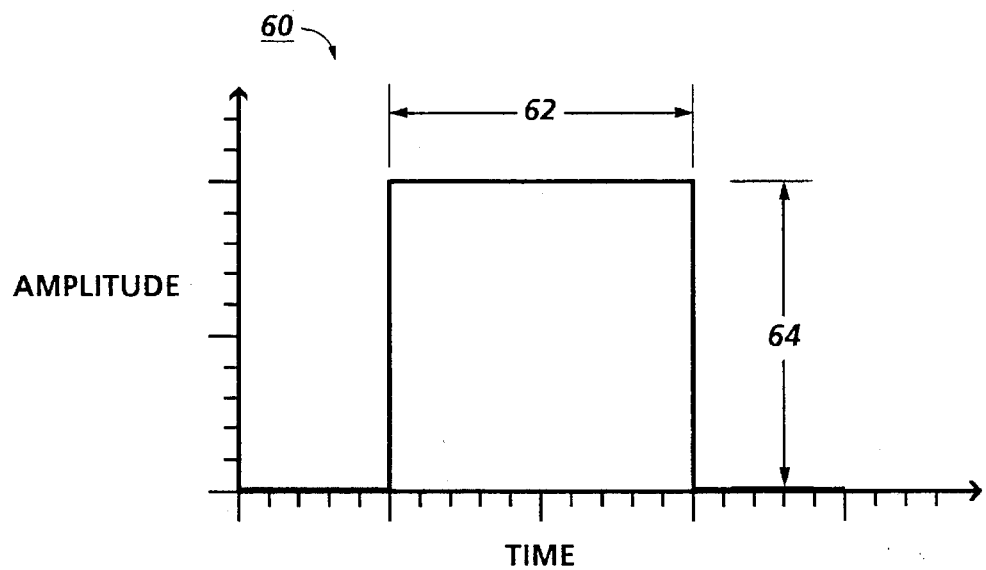
FIG. 6 shows a pulse representing an On pixel of a conventional train of pixel information.

Referring to FIG. 6, there is shown a pulse 60 representing an On pixel of a conventional train of pixel information. The horizontal axis represents time and the vertical axis represents amplitude. As it can be observed, pulse 60 has a pulse width 62 and a pulse amplitude 64. Typically, the pulse width 62 of a pixel determines the duration of the On or Off time of the light beam for that pixel and the pulse amplitude 64 determines the power or energy of the light beam. The average image exposure for each pixel is the pulse width 62 or the pixel On time multiplied by the pulse amplitude 64 or the power. It should be noted that the pulse width 62 and the pulse amplitude 64 are kept the same for all the pixels.

This invention suggests a different approach to reduce smearing effect and the variation of pixel width with the variation of xerographic level. By reducing the pulse width, the duration that the light beam is On will be reduced. Therefore, a light beam will cover a shorter distance during the time that it is On for that pixel. However, the average image exposure for each pixel should be kept the same, meaning that the product of the pulse width and the pulse amplitude should be kept the same as the product of a conventional pulse width to a conventional pulse amplitude. This implies that the pulse amplitude should be increased as the pulse width is decreased. A shorter pulse width with a higher amplitude causes the exposure to have a taller and a narrower distribution profile which in turn fits into the allocated space d and smears less into the adjacent pixel areas. Also, with taller and narrower distribution profile the slope will be steeper which reduces the pixel width variation in accordance with the variation of the xerographic threshold.

Figure 7:
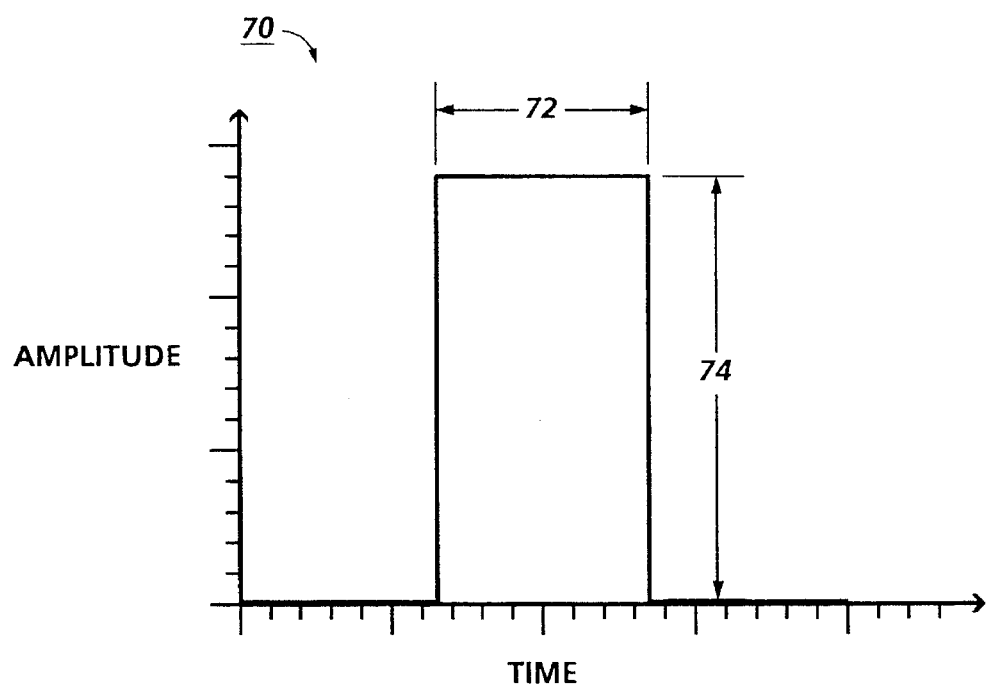
FIG. 7 shows the pulse of FIG. 6 which is modified by this invention.

Referring to FIG. 7, there is shown a modified version 70 of the pulse 60 of FIG. 6. The horizontal axis represents time and the vertical axis represents amplitude. Referring to both FIGS. 6 and 7, Pulse 70 is modified by this invention to reduce the smearing effect and as a result increase the image contrast. Pulse 70 has a shorter pulse width 72 compared to a conventional pulse width 62 and also has a higher pulse amplitude 74 compared to a conventional pulse amplitude 64. The product of the pulse width 72 and the pulse amplitude 74 is the same as the product of the pulse width 62 and the pulse amplitude 64.

It should be noted that in this invention, the pixels will be modified to have a pulse width in the range of 0.8 to 0.4 of the allocated pixel space.

In this invention, the intention is to narrow the exposure profile to reduce the smearing effect and increase the slope of the exposure profile to reduce the pixel width variation with variation of the xerographic threshold without changing the width of the light beam. By decreasing the pulse width and increasing the amplitude of the pulse in such a manner that the product of the pulse width and the pulse amplitude stays the same as the product of a conventional pulse width and a conventional pulse amplitude, the smearing and the variation of the pixel width in accordance with the variation of the xerographic threshold will be reduced.

Figure 8:
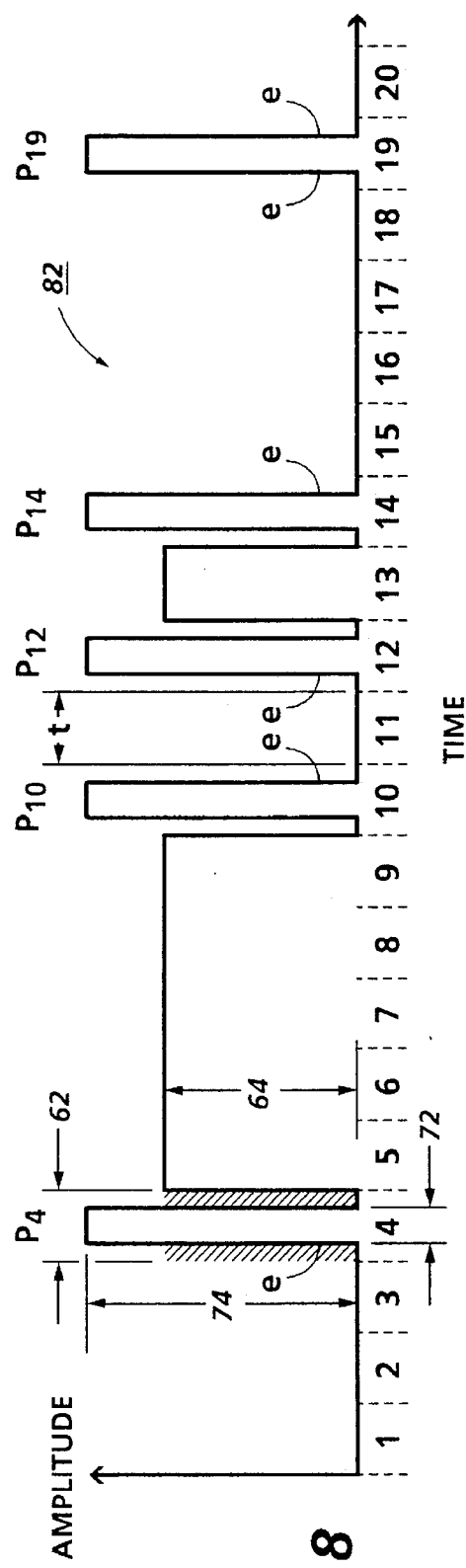
FIG. 8 shows the train of pixel information of FIG. 4 which is modified by this invention.

The raster output scanner of this invention receives a conventional train of pixel information and modifies certain On pixels in accordance with the suggested approach of this invention. This is illustrated in FIG. 8, where there is shown a train of pixel information 82 which is a modified version of the train of pixel information 40 shown in FIG. 4. In FIG. 8, the horizontal axis represents time and the vertical axis represents amplitude. The train of pixel information 82 is modified by this invention to reduce the smearing effect and as a result increase the image contrast. As it can be observed, only the pixels P4, P10, P12, P14 and P19, which have at least one transitional edge e, are modified. The pixels with at least one transitional edge include all the single On pixels such as P19 and all the pixels which are located at the start and at the end of a group of On pixels such as the starting pixels P4 and P12 and the ending pixels P10 and P15.

Each one of the pixels P4, P10, P12 and P19, which has at least one transitional edge e, is modified to have a narrower pulse width 72 from either direction compared to a conventional pulse width 62 and to have an increased amplitude 74 compared to a conventional pulse amplitude 64. In this approach, when the modified pixel smears into the adjacent pixels, the smearing will be less than the smearing of an unmodified pixel.

Figure 9:
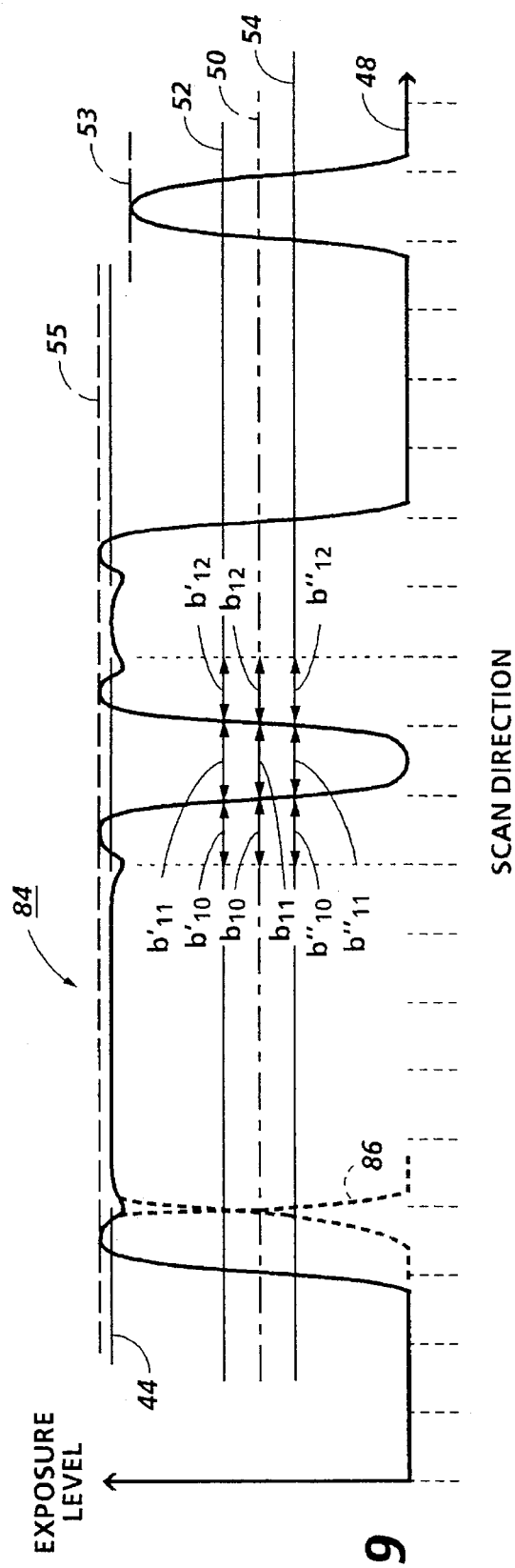
FIG. 9 shows the exposure profile generated on a photoreceptor plane by the train of pixel information of FIG. 8.

In this invention, the train of pixel information 82 (FIG. 8) will be used instead of the train of pixel information 40 (FIG. 4) to modulate the light beam. Referring to FIG. 9, once the modulated light beam scans the photoreceptor, it creates an exposure profile 84 on the photoreceptor plane. As it can be observed, all the modified pixels, even the single pixels such as Pixel P19, will have a narrower distribution profile and a steeper slope than the unmodified pixels. In the exposure profile 84, the unmodified On pixels create the same maximum level 44 as the maximum level 44 (FIG. 5) of a conventional train of pixel information. However, the modified pixels which are adjacent to unmodified On pixels will create a maximum level 55 which is higher than maximum level 44.

The exposure profile 84 is an improved exposure profile compared to the exposure profile 42 (FIG. 5) generated by a conventional train of pixel information 40 (FIG. 4). In the exposure profile 84, the smearing effect is substantially reduced. Since the Gaussian distribution 86 of the modified pixel P4 (train of pixel information 82) is taller and narrower than the Gaussian distribution 34 (FIG. 5) of the unmodified pixel P4 (train of pixel information 40), the exposure profile 84 for pixel P4 smears less into the adjacent Off pixel P3. In the same manner, the exposure profile 84 for pixels P4, P10, P12, P14 and P19 smears less into their adjacent Off pixels P3, P11, P15, P18 and P20 respectively.

Also, since the exposure profile 84 has steeper transitional edges, when the xerographic threshold changes the variation of the pixel width will be minimal. For example, when the xerographic threshold changes from 50 to 52 or 54, the pixel widths for pixels P10, P11 and P12 change from $b_{10}$, $b_{11}$ and $b_{12}$ to $b_{10}'$, $b_{11}'$ and $b_{12}'$ or $b_{10}''$, $b_{11}''$ and $b_{12}''$ respectively. As it can be observed, the variation of the pixel width in accordance with the xerographic threshold is minimal.

The reason for not modifying the On pixels between two modified pixels, in a group of pixels which have two On pixels with at least one transitional edge, is that the smearing effect and the pixel width variation in accordance with the xerographic threshold variation occurs only at the pixels which have transitional edge e. The On pixels which do not have a transitional edge smear into the adjacent On pixels which does not cause any problem. Also, they have a fixed pixel width which does not vary with the change in the xerographic threshold. As a result, there is no need to modify the On pixels which do not have a transitional edge. Furthermore, by keeping these pixels unmodified, the exposure profile will have less ripples which is more desirable for some scanning systems.

Figure 10:
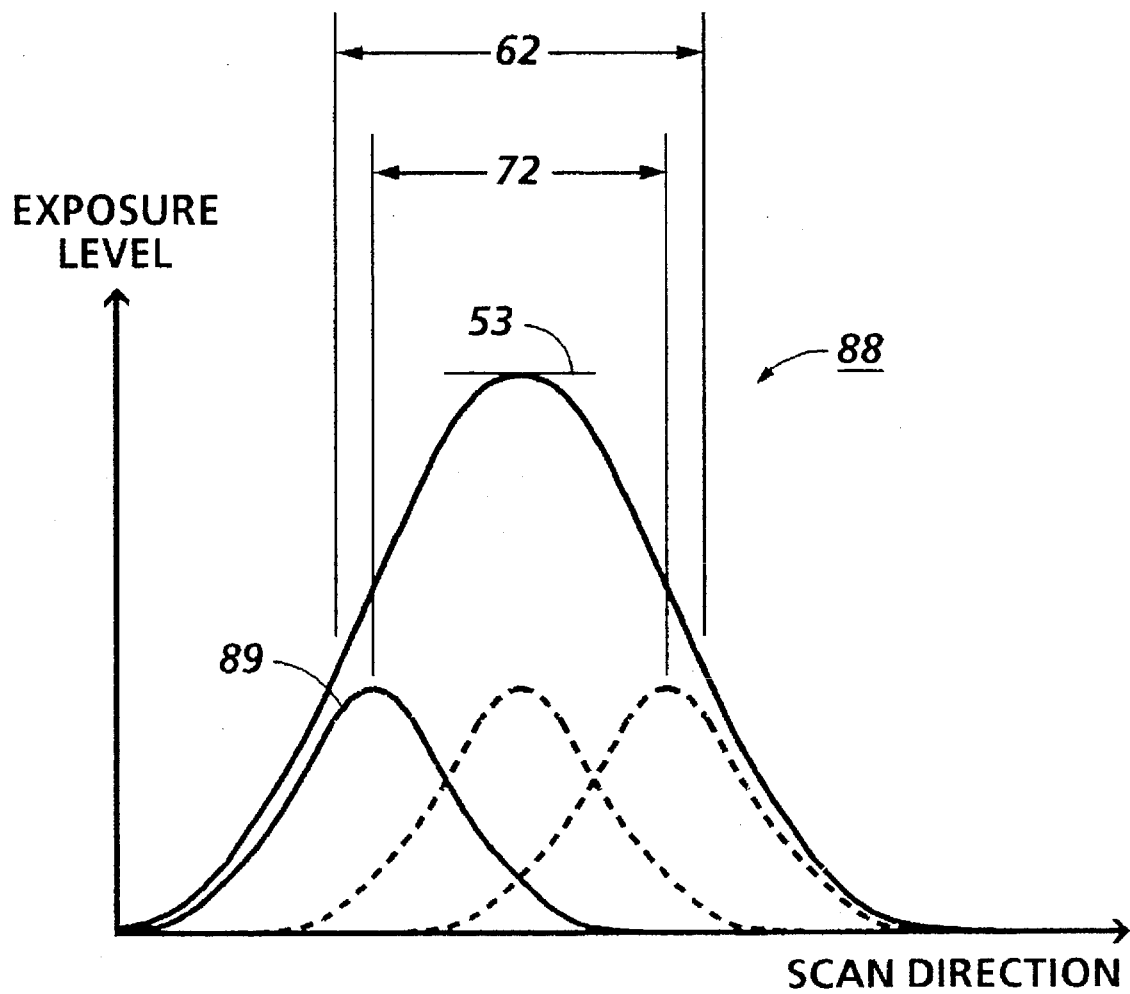
FIG. 10 shows an exposure profile corresponding to the pulse shown in FIG. 7.

In addition to the above improvements resulted from modifying the On pixels with at least one transitional edge, the maximum level of the exposure profile of a single On pixel is also increased. Referring to FIG. 10, there is shown an exposure profile 88 on a photoreceptor being generated through a single modified pulse shown in FIG. 7. In FIG. 10, the horizontal axis represents scan direction and the vertical axis represents exposure level. As it can be observed, the light beam is On for a shorter time, but with a higher amplitude. Since the energy 89 deposited by this light beam has a higher amplitude, the sum of the energies will provide an exposure profile 88 which has a higher maximum level 53 compared to the maximum level 46 (FIG. 5) of a single unmodified pixel. This further improves the contrast.

Figure 11:
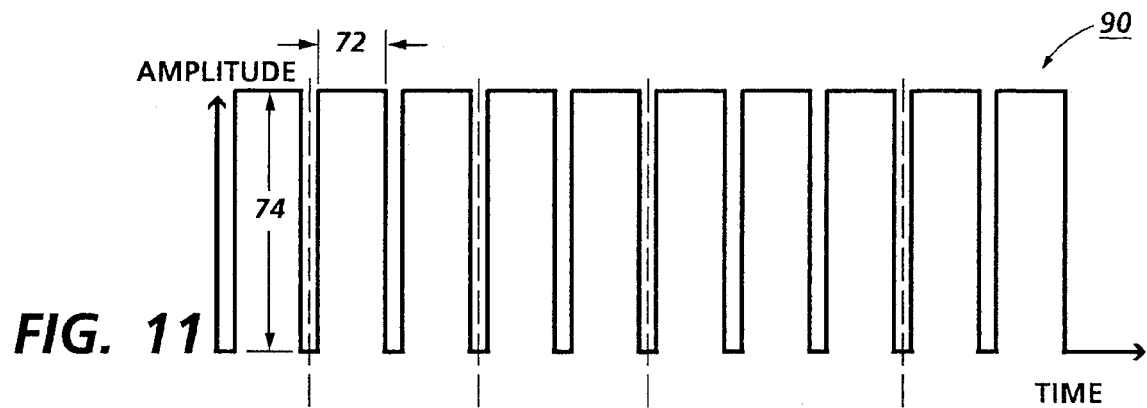
FIG. 11 shows a continuous train of pulses.
Figure 12:
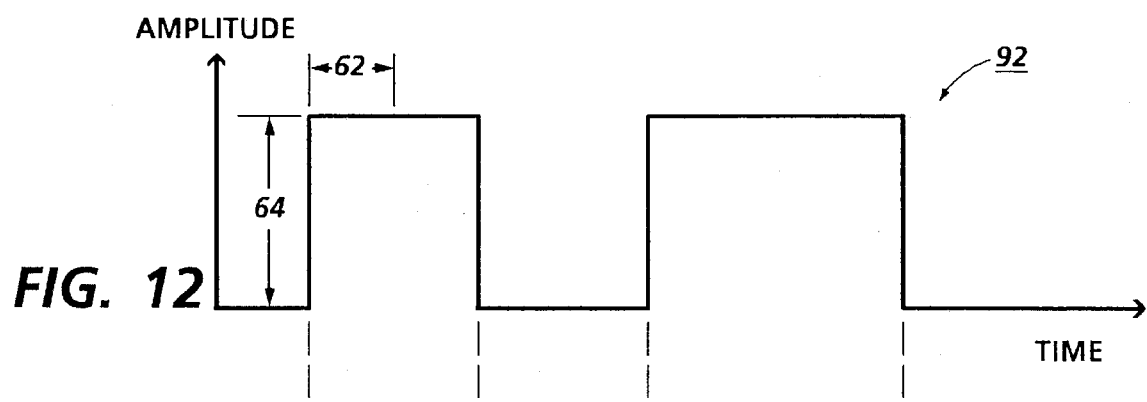
FIG. 12 shows an arbitrary train of pixel information.
Figure 13:
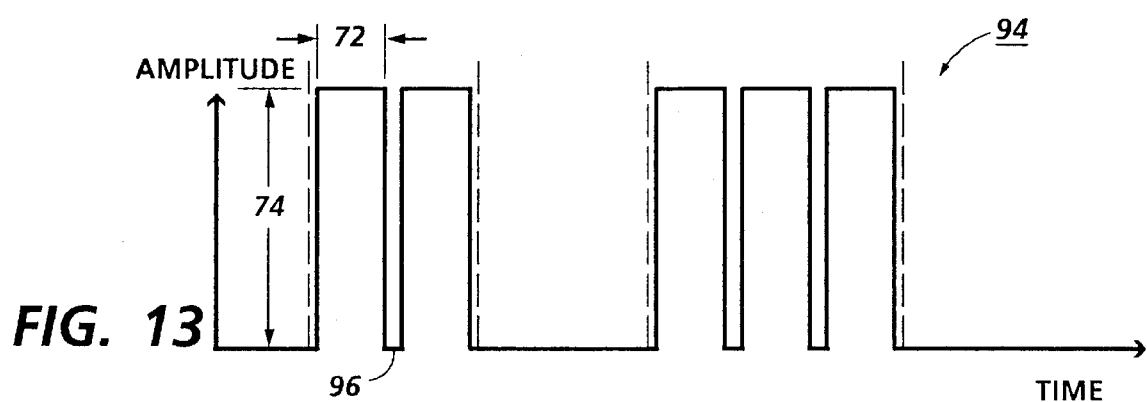
FIG. 13 shows the train of pixel information of FIG. 12 which is modified by the continuous train of pulses of FIG. 11.

Referring to FIGS. 11, 12 and 13, there are shown different trains of pulses and pixel information for a different approach to shorten the pulse width and increase the pulse amplitude of an On pixel. In FIGS. 11, 12 and 13, the horizontal axes represent time and the vertical axes represent amplitude. Referring to both FIGS. 11 and 12, there are shown a continuous train of pulses 90 and a train of pixel information 92 respectively.

In this approach all the On pixels including the On pixels which do not have a transitional edge are modified, but the off pixels remain the same. This approach simplifies the modification of the train of pixel information in which there is no need to identify the On pixels with at least one transitional edge. This approach uses a continuous train of pulses 90 which has a shorter pulse width 72 and a higher pulse amplitude 74 compared to the pulse width 62 and the pulse amplitude 64 of a conventional train of pixel information 92. The continuous train of pulses 90 will be used to modify all the On pixels of the conventional train of pixel information 92.

Figure 14:
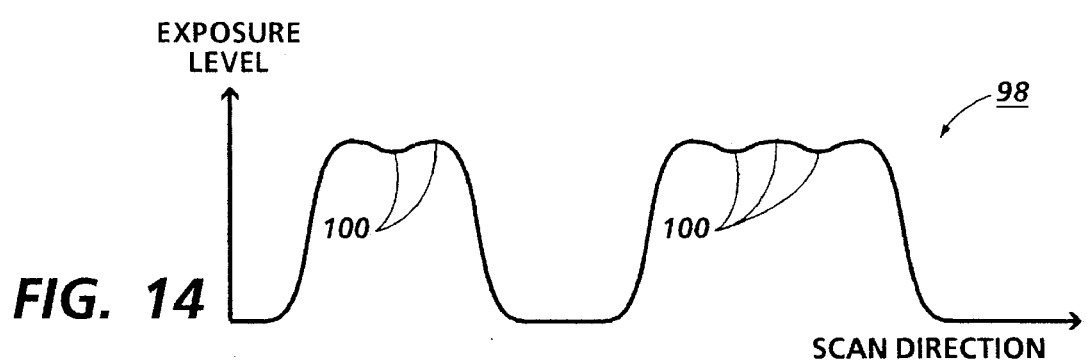
FIG. 14 shows the exposure profile generated on a photoreceptor plane by the train of pixel information of FIG. 13.

By multiplying the train of pixel information 92 with the continuous train of pulses 90, a modified train of pixel information 94 (FIG. 13) will be generated in which all the On pixels are modified to have a shorter pulse width 72 and a higher pulse amplitude 74 compared to the unmodified pixels of FIG. 12. The modified train of pixel information 94 (FIG. 13) has a short space 96 between any two adjacent On pixels in which the light beam has to be turned Off. The short space 96 will cause the exposure profile 98 (FIG. 14) to have ripples 100. However, the ripples 100 are negligible.

It should be noted that some scanning systems can tolerate the ripples on an exposure profile and some can not. Therefore, depending on the requirements of the system one of the disclosed approaches can be used to improve the image contrast.

I claim:

1. A raster output scanning system, comprising:

a light source for emitting a light beam;

a medium;

scanning means located in the path of said light beam from said light source and being so constructed and arranged to scan said light beam across said medium;

means for providing a train of pixel information;

means for modulating the light beam in accordance with the train of pixel information;

the improvement comprising the train of pixel information having the following characteristics:

a. a plurality of groups of On pixels and a plurality of Off pixels;

b. each of said plurality of groups of On pixels comprising two transitional type On pixels one at each end and at least one second type On pixel therebetween;

c. one of said transitional type On pixels being preceded by an Off pixel and the other of said transitional type On pixels being followed by an Off pixel;

d. each of said plurality of second type On pixels having a width and an amplitude in such a manner that the product of the width and the amplitude of said plurality of second type On pixels is equal to a given value; and e. each of said transitional type On pixels having a width shorter than the width of each said second type On pixel and having an amplitude higher than the amplitude of each said second type On pixel in such a manner that the product of the width and the amplitude of each said transitional type On pixel is substantially equal to said given value.

2. The raster output scanning system recited in claim 1, further comprising a plurality of groups of a single transitional type On pixels preceded by and followed by an Off pixel.

3. The raster output scanning system recited in claim 1, further comprising a plurality of groups of two successive transitional type On pixels with one of said transitional type On pixel being preceded by an Off pixel and the other of said transitional type On pixels being followed by an Off pixel.

4. The raster output scanning system recited in claim 2, further comprising a plurality of groups of two successive transitional type On pixels with one of said transitional type On pixel being preceded by an Off pixel and the other of said transitional type On pixels being followed by an Off pixel.

5. The raster output scanning system recited in claim 1, wherein each of said transitional type On pixels generates an exposure profile which substantially fits in an allocated pixel space.

\* \* \* \* \*